(12) United States Patent
Yu et al.

(10) Patent No.: US 8,683,094 B2
(45) Date of Patent: Mar. 25, 2014

(54) METHOD FOR ENHANCING DATA TRANSMISSION EFFICIENCY

(75) Inventors: Ching-Hwa Yu, Tainan (TW); Chen-Hai Yu, Hsinchu County (TW)

(73) Assignee: Ralink Technology, Corp., Jhubei, Hsinchu County (TW)

( * ) Notice: Subject to any disclaimer, the term of this patent is extended or adjusted under 35 U.S.C. 154(b) by 437 days.

(21) Appl. No.: 12/580,278

(22) Filed: Oct. 16, 2009

(65) Prior Publication Data

US 2010/0281189 A1  Nov. 4, 2010

(30) Foreign Application Priority Data

Apr. 30, 2009  (TW) .............................. 98114334 A (51) Int. Cl.
G06F 3/00 (2006.01)
(52) U.S. Cl.
USPC .................. 710/29; 710/33; 710/36; 710/52; 710/57; 710/65; 710/66; 370/229; 370/230; 370/230.1; 370/231; 370/235; 370/236
(58) Field of Classification Search
None
See application file for complete search history.

(56) References Cited

U.S. PATENT DOCUMENTS

| | | | | |
|---|---|---|---|---|
| 5,063,562 A * | 11/1991 | Barzilai et al. | ................ | 370/231 |
| 5,289,470 A * | 2/1994 | Chang et al. | .................. | 711/173 |
| 5,481,303 A * | 1/1996 | Uehara | ....................... | 348/231.1 |
| 5,541,919 A * | 7/1996 | Yong et al. | .................... | 370/416 |
| 5,916,309 A * | 6/1999 | Brown et al. | .................... | 710/52 |
| 6,404,776 B1 * | 6/2002 | Voois et al. | ................... | 370/468 |
| 6,415,410 B1 | 7/2002 | Kanerva | ........................ | 714/749 |
| 6,646,987 B1 * | 11/2003 | Qaddoura | ..................... | 370/231 |
| 6,745,260 B1 * | 6/2004 | Young | ............................. | 710/36 |
| 7,003,597 B2 * | 2/2006 | Georgiou et al. | .............. | 710/56 |
| 7,287,086 B2 * | 10/2007 | Krissell | ......................... | 709/232 |
| 7,296,100 B1 * | 11/2007 | Venkatesh et al. | ............. | 710/33 |
| 7,743,183 B2 | 6/2010 | Virdi | .............................. | 710/52 |
| 7,889,654 B2 * | 2/2011 | Ramakrishnan et al. | ...... | 370/231 |
| 7,948,649 B2 * | 5/2011 | Kim | .............................. | 358/1.16 |
| 8,019,382 B2 * | 9/2011 | Rush et al. | ................. | 455/553.1 |
| 8,306,062 B1 * | 11/2012 | Cohen | .......................... | 370/473 |
| 2003/0081664 A1 * | 5/2003 | Lu et al. | ........................ | 375/222 |
| 2003/0103452 A1 * | 6/2003 | Le et al. | ........................ | 370/229 |
| 2003/0191854 A1 | 10/2003 | Hsu | ............................... | 709/233 |

(Continued)

FOREIGN PATENT DOCUMENTS

CN 1183870 A 6/1998
CN 101203827 A 6/2008

(Continued)

OTHER PUBLICATIONS

IBM Technical Disclosure Bulletin NA9404439, Continuous Data Passing Using Sliding Window Control, Apr. 1, 1994.*

*Primary Examiner* — Steven Snyder
(74) *Attorney, Agent, or Firm* — Winston Hsu; Scott Margo (57) ABSTRACT

A method for enhancing data transmission efficiency in a data transmission system having a host, a subsystem and a transmission interface, utilized for the host to transmit and receive a data from a memory of the subsystem via the transmission interface includes steps of the host outputting a query command to the subsystem via the transmission interface for querying available memory utilization of the subsystem; the subsystem outputting a return message to the host via the transmission interface for indicating the available memory utilization according to the query command; and controlling data transmission from the host to the subsystem according to the return message.

17 Claims, 7 Drawing Sheets

(56) References Cited

U.S. PATENT DOCUMENTS

| | | | |
|---|---|---|---|
| 2004/0104924 A1* | 6/2004 | Braun et al. | 345/701 |
| 2005/0010677 A1* | 1/2005 | Krissell | 709/232 |
| 2005/0060442 A1* | 3/2005 | Beverly et al. | 710/33 |
| 2005/0091425 A1* | 4/2005 | Wyatt et al. | 710/33 |
| 2006/0141946 A1* | 6/2006 | Rush et al. | 455/92 |
| 2006/0262351 A1* | 11/2006 | Kim | 358/1.16 |
| 2007/0149115 A1* | 6/2007 | White et al. | 455/3.06 |
| 2008/0212472 A1* | 9/2008 | Musacchio et al. | 370/232 |

FOREIGN PATENT DOCUMENTS

| | | |
|---|---|---|
| TW | 247948 | 5/1995 |
| TW | 546931 | 8/2003 |
| TW | 575809 | 2/2004 |

\* cited by examiner

METHOD FOR ENHANCING DATA TRANSMISSION EFFICIENCY

BACKGROUND OF THE INVENTION

1. Field of the Invention

The present invention relates to a method for enhancing data transmission efficiency, and more particularly, to a method of flow control between a host and a subsystem for enhancing data transmission efficiency.

2. Description of the Prior Art

The continuous evolution of wireless communication networks has significantly changed the speed and convenience of information exchange, and consequently more and more electronic devices (such as personal computers, handheld devices, etc.) have been developed into wireless transceiving devices with the advancement of related technologies. The wireless transceiving devices not only transmit or receive wireless signals via the hardware circuits (such as antennas, mixers, demodulators, etc.), but also control the operation of the hardware via software (i.e. a driver), where the connection between software and hardware lies on a specific transmission interface.

Figure 1:
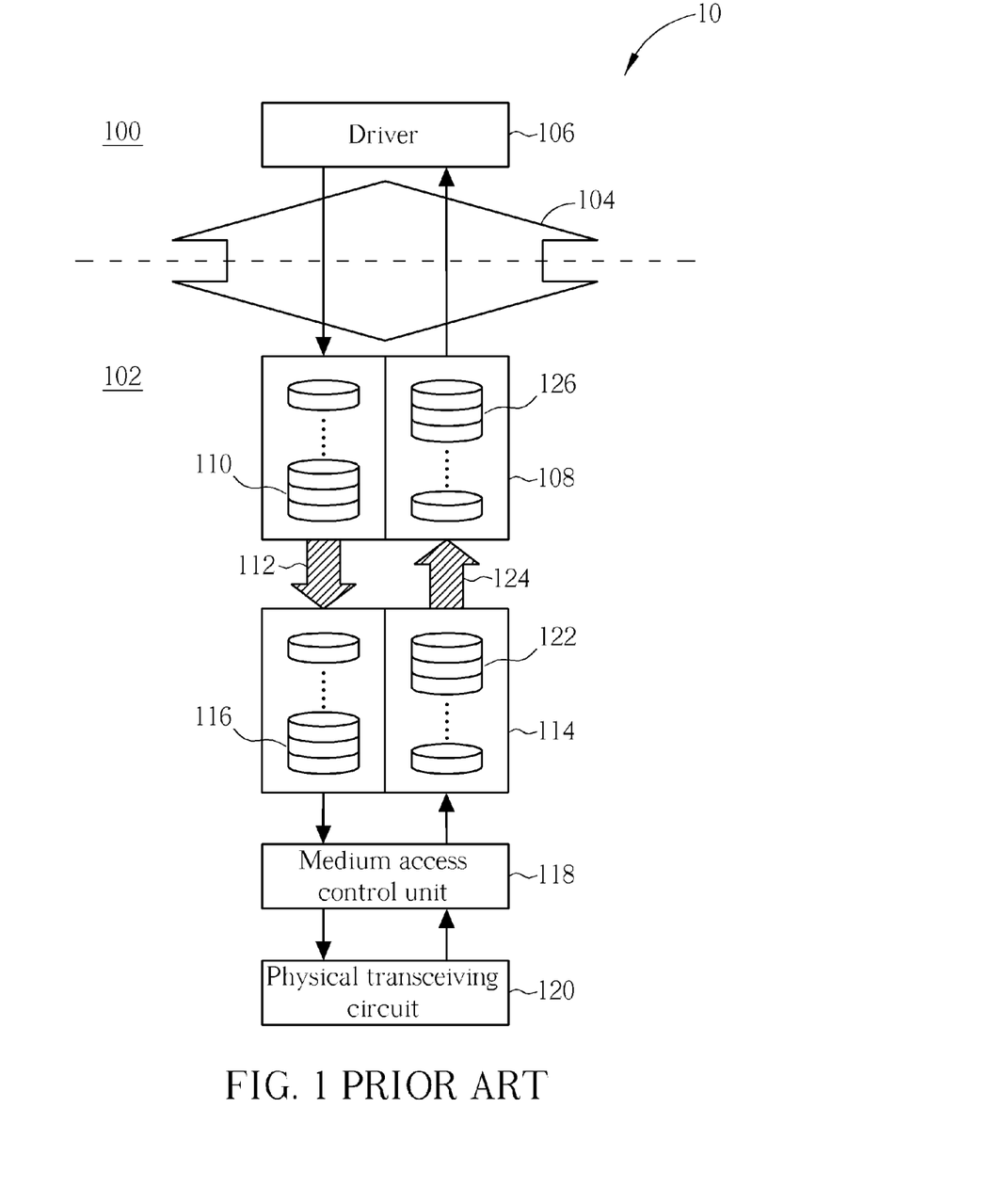
FIG. 1 is a schematic diagram of a conventional data transmission system.

Please refer to FIG. 1, which is a schematic diagram of a conventional data transmission system 10. The data transmission system 10 is utilized in a wireless transceiving device (i.e. a wireless network adapter) and composed of a host 100, a subsystem 102 and a transmission interface 104. The host 100 corresponds to the software part of the wireless transceiving device for controlling the operation of the subsystem 102 via a driver 106, while the subsystem 102 corresponds to the hardware part for transmitting or receiving data packets. The transmission interface 104 is formed between the host 100 and the subsystem 102, for transmitting signals between the host 100 and the subsystem 102. Taking a data packet transmission as an example, the driver 106 first transmits the queued packet to an asynchronous first in first out (ASYNC FIFO) 108 of the subsystem 102 via the transmission interface 104 and puts it in a transmission queue 110; the subsystem 102 stores the queued packet of the transmission queue 110 into a transmission queue 116 of a memory 104 via a direct memory access 112 channel via the method of first in first out; and finally, a medium access control (MAC) unit 118 transmits the queued packet to a physical transceiving circuit 120, for completing the operation of data transmission. The data packet received by the physical transceiving circuit 120 is stored into a reception queue 122 of the memory 114 via the MAC unit 118, and then is transmitted to a reception queue 126 of the ASYNC FIFO 108 via a direct memory access 124, and finally the data packet is transmitted to the driver 106 for performing related processes.

In the data transmission system 10, the transmission interface 104 is utilized for transmitting data packets between the host 100 and the subsystem 102. When the wireless transceiving device corresponding to the data transmission system 10 is utilized in a portable communication device (such as a mobile phone), the transmission interface 104 is usually implemented by low speed interfaces for decreasing power consumption, such as a secure digital input/output (SDIO) interface, serial peripheral interface (SPI), generic serial peripheral interface (GSPI), etc. However, taking the 802.11n standard as an example, transmission rates have been enhanced up to 50 Mbps. Under such circumstances, when the transmission interface 104 processes data transmission via low speed interfaces SDIO/SPI/GSPI, the volume of the memory 114 is easily exhausted, which may cause a race condition that decreases transmission efficiency due to the transmission and reception queued packets in the memory 114.

To improve the above-mentioned problem, the most instinctive solution is to increase the volume of the memory 114 for preventing the memory 114 from becoming full easily. However, this solution increases production costs and may result in longer packet latency, thereby affecting transmission rate and quality.

SUMMARY OF THE INVENTION

It is therefore a primary objective of the claimed invention to provide a method for enhancing data transmission efficiency in a data transmission system.

The present invention discloses a method for a data transmission system having a host, a subsystem and a transmission interface, utilized for the host to transmit and receive a data from a memory of the subsystem via the transmission interface. The method includes steps of the host outputting a query command to the subsystem via the transmission interface for querying available memory utilization of the subsystem; the subsystem outputting a return message to the host via the transmission interface for indicating the available memory utilization according to the query command; and controlling data transmission from the host to the subsystem according to the return message.

The present invention further discloses a method for a data transmission system having a host, a subsystem and a transmission interface. The method includes steps of the host transmitting data to a memory of the subsystem via the transmission interface; the subsystem generating an indication message transmitted to the host via the transmission interface according to memory utilization; and controlling data transmission from the host to the subsystem according to the indication message.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
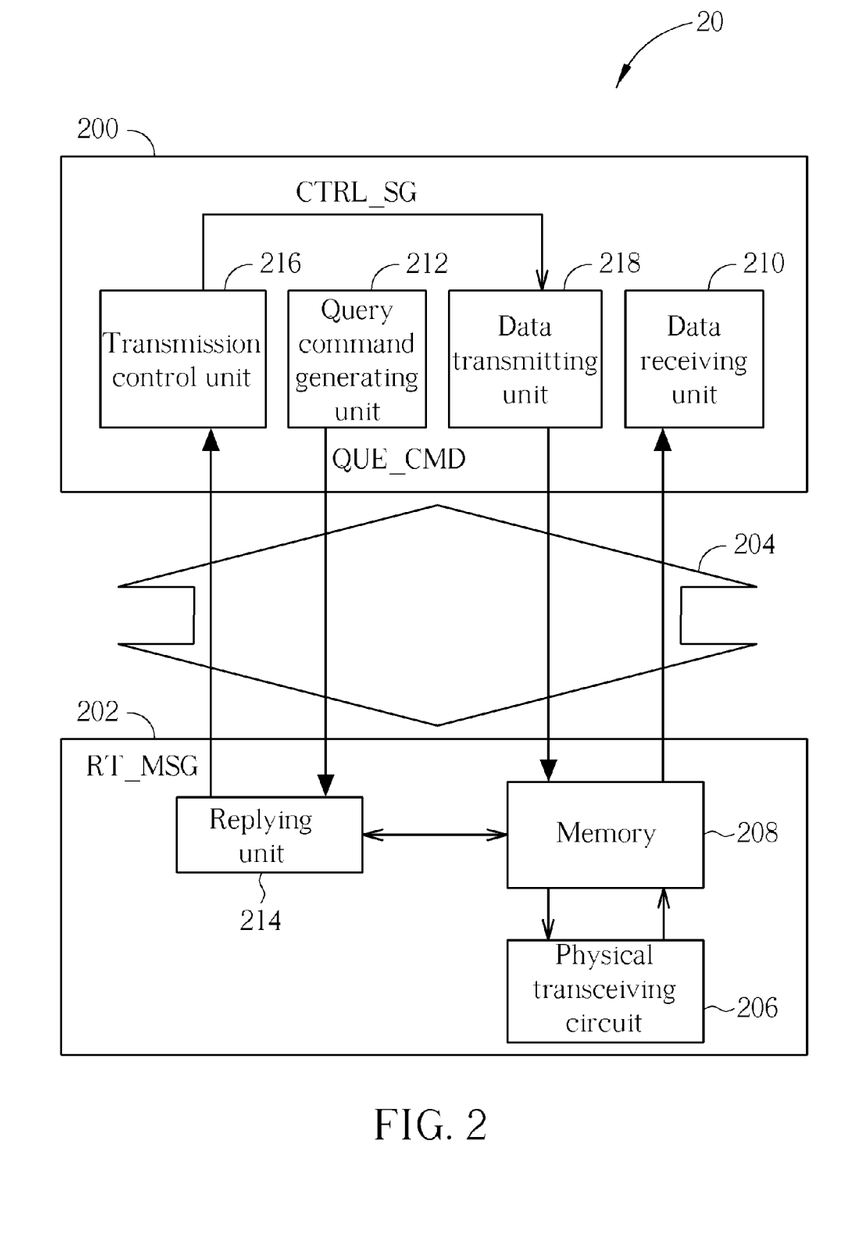
FIG. 2 is a schematic diagram of a data transmission system according to an embodiment of the present invention.

Please refer to FIG. 2, which is a schematic diagram of a data transmission system 20 according to an embodiment of the present invention. The data transmission system 20 is preferably utilized in a wireless transceiving device (i.e. wireless network adapter), for enhancing the efficiency of data transmission, which includes a host 200, a subsystem 202 and a transmission interface 204. The transmission interface 204 is implemented with low speed interfaces (compared to the subsystem 202) such as SDIO, SPI, GSPI, etc., for transmitting signals between the host 200 and the subsystem 202. The host 200 comprises a data receiving unit 210, a data transmitting unit 218, a query command generating unit 212, and a transmission control unit 216. The subsystem 202 comprises a memory 208, a replying unit 214 and a physical transceiving circuit 206. The operation of the data transmission system 20 is described in reception and transmission parts, respectively. First, the physical transceiving circuit 206 performs the reception and transmission of the data packets. When receiving a data packet, the physical transceiving circuit 206 receives the data packet via the radio channel and stores the data packet into the memory 208. Next, the data receiving unit 210 receives the data packet stored in the memory 208 via the transmission interface 204, and performs the follow-up processes to complete the reception operation of the data packet. When transmitting the data packet, the query command generating unit 212 first generates a query command QUE_CMD and transmits the query command QUE_CMD to the replying unit 214 of the subsystem 202 via the transmission interface 204. The replying unit 214 queries the available memory utilization of the memory 208 according to the query command QUE_CMD and replies a return message RT_MSG for replying related data to the transmission control unit 216 of the host 200 via the transmission interface 204. The transmission control unit 216 outputs a control signal CTRL_SG to the data transmitting unit 218 according to the return message RT_MSG, to control the data transmission operation of the data transmitting unit 218.

Simply speaking, before the host 200 wants to transmit the data packet to the subsystem 202, the query command generating unit 212 generates the query command QUE_CMD to the replying unit 214, for asking the replying unit 214 to reply the return message RT_MSG to the transmission control unit 216, so as to get the available memory utilization information of the memory 208. After receiving the return message RT_MSG, the transmission control unit 216 determines the available memory utilization of the memory 208 according to the return message RT_MSG and further controls the data transmission operation of the data transmitting unit 218. For example, when the return message RT_MSG indicates that the available memory utilization of the memory 208 is higher than a default byte Vth (or specific percentage), the transmission control unit 216 controls the data transmitting unit 218 by the control signal CTRL_SG to start transmitting the data packet to the memory 208 of the subsystem 202 via the transmission interface 204, for the physical transceiving circuit 206 to transmit to the destination communication end. If the return message RT_MSG indicates that the available memory utilization of the memory 208 is lower than the default byte Vth, the transmission control unit 216 controls the data transmitting unit 218 by the control signal CTRL_SG to stop transmitting the data packet to the memory 208; or, the transmission control unit 216 can adjust the size of the data packet to prevent the memory 208 from being full.

Therefore, before the host 200 wants to transmit the data packet to the subsystem 202, the host 200 first queries whether the available memory utilization of the memory 208 of the subsystem 202 is enough, and then determines whether to perform transmission according to the return message RT_MSG of the subsystem 202. Since the host 200 sends out the query command QUE_CMD to query the available memory utilization of the memory 208 every time before transmitting the data packet, the host can know the available memory utilization of the memory 208 according to the return message RT_MSG of the subsystem 202 every time before performing the data packet transmission, and further can controls the progress of data transmission and adjust the size of the data packet, so as to enhance the utilization efficiency of the memory 208.

Please note that, the data transmission system 20 shown in FIG. 2 is one embodiment of the present invention, and those skilled in the art can make modifications and alterations. For example, the query command QUE_CMD can be implemented by a standard SDIO/SPI/GSPI command, mailbox, or other interfaces, etc. Similarly, the return message RT_MSG is preferably carried in a return packet or realized by methods such as standard SDIO/SPI/GSPI commands, which transmits the available memory utilization of the memory 208 to the transmission control unit 216 of the host 200.

As mentioned above, the transmission control unit 216 controls the data transmitting unit 218 to start or to stop data transmission according to the return message RT_MSG. Practically, the method of the transmission control unit 216 controls the data transmitting unit 218 to not be confined to the two-stage control, start and stop. For instance, the present invention can set up default bytes (or percentage) Vth1 and Vth2 corresponding to the volume of the memory 208, and Vth1 is lower than Vth2. When the return message RT_MSG indicates that the available memory utilization of the memory 208 is higher than the default byte Vth2, the transmission control unit 216 controls the data transmitting unit 218 to start data transmission; when the return message RT_MSG indicates that the available memory utilization of the memory 208 is between the default bytes Vth1 and Vth2, the transmission control unit 216 controls the data transmitting unit 218 to perform data transmission with smaller sized data packets; and when the return message RT_MSG indicates the available memory utilization of the memory 208 is lower than the default byte Vth1, the transmission control unit 216 controls the data transmitting unit 218 to stop data transmission. The three-stage control method mentioned above illustrates one possible alteration of the present invention instead of confining the range of the present invention. In addition, the data transmission system 20 in FIG. 2 illustrates the scope of the present invention, and practically those skilled in the art can make modifications and alterations according to different requirements.

Comparing with the conventional system, in the data transmission system 20 of the present invention, before the host 200 transmits the data packet to the subsystem 202, the host 200 queries the available memory utilization of the memory 208 every time, for allowing the host 200 to sufficiently control the utilization status of the memory 208 without reaching the full condition, so as to avoid the race condition and further to enhance the transmission rate.

Figure 3:
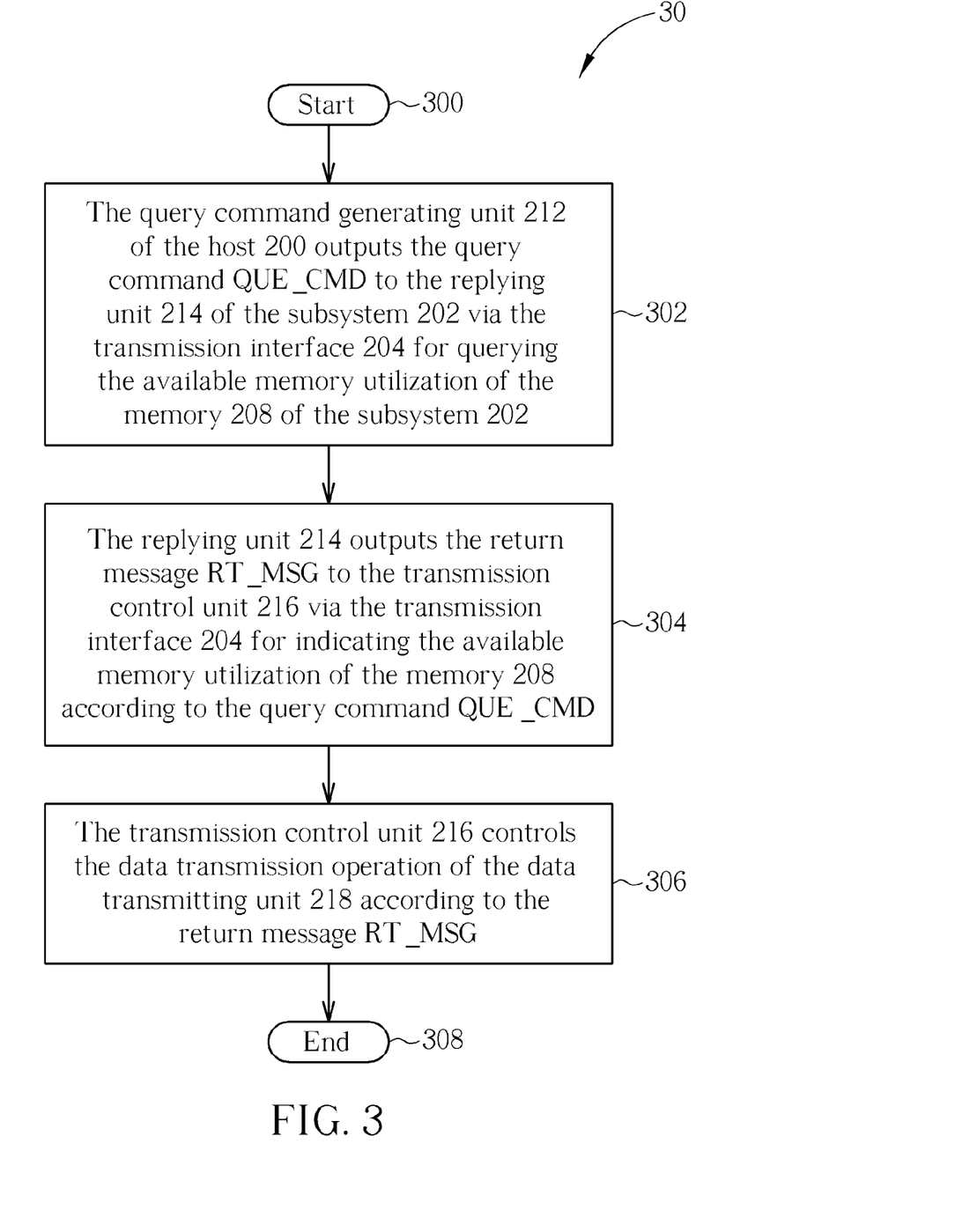
FIG. 3 is a flow chart of a control process according to an embodiment of the present invention.

Regarding the operation of the data transmission system 20, a control flow 30 is further shown in FIG. 3. The control flow 30 includes the following steps:

Step 300: Start.

Step 302: The query command generating unit 212 of the host 200 outputs the query command QUE_CMD to the replying unit 214 of the subsystem 202 via the transmission interface 204 for querying the available memory utilization of the memory 208 of the subsystem 202.

Step 304: The replying unit 214 outputs the return message RT_MSG to the transmission control unit 216 via the transmission interface 204 for indicating the available memory utilization of the memory 208 according to the query command QUE_CMD.

Step 306: The transmission control unit 216 controls the data transmission operation of the data transmitting unit 218 according to the return message RT_MSG.

Step 308: End.

The control flow 30 illustrates the operation of the data transmission system 20. As the detailed illustration is provided above, it is not repeated herein.

In the data transmission system 20, when the host 200 wants to transmit the data to the subsystem 202, the host 200 needs to actively query the utilization status of the memory 208 of the subsystem 202, and then perform the follow-up control via the return message RT_MSG outputted from the subsystem 202. Therefore, one action of the host 200 outputting the query command is added in the operation, which may affect the efficiency of the transmission rate because the query action needs to be performed every time data transmission occurs. To improve the problems mentioned above, another embodiment of the present invention is provided. Please refer to FIG. 4, which is a schematic diagram of a data transmission system 40 according to an embodiment of the present invention. The data transmission system 40 comprises a host 400, a subsystem 402 and a transmission interface 404. The transmission interface 404 is implemented with low speed interfaces (compared to the subsystem 402) such as SDIO, SPI, GSPI, etc., for transmitting signals between the host 400 and the subsystem 402. The host 400 comprises a data receiving unit 410, a data transmitting unit 412, and a transmission control unit 416. The subsystem 402 comprises a memory 408, a control unit 414 and a physical transceiving circuit 406. Regarding the operation of the data transmission system 40, written illustration is divided into reception and transmission. First, the physical transceiving circuit 406 performs the reception and transmission of the data packets. When receiving the data packet, the physical transceiving circuit 406 receives the data packet via the radio channel and stores the data packet into the memory 408. Next, the data receiving unit 410 receives the data packet stored in the memory 408 via the transmission interface 404, and performs the follow-up processes to complete the reception operation of the data packet. When transmitting a data packet, the data transmitting unit 412 starts to continuously transmitting the data packet to the memory 408, and the control unit 414 outputs an indication message IND_MSG to the transmission control unit 416 of the host 400 via the transmission interface 404 when the volume of the memory 408 reaches a default byte Vth (or specific percentage). The transmission control unit 416 generates a control signal CTRL_SG1 to the data transmitting unit 412 according to the indication message IND_MSG, for controlling the data transmission operation of the data transmitting unit 412.

Figure 4:
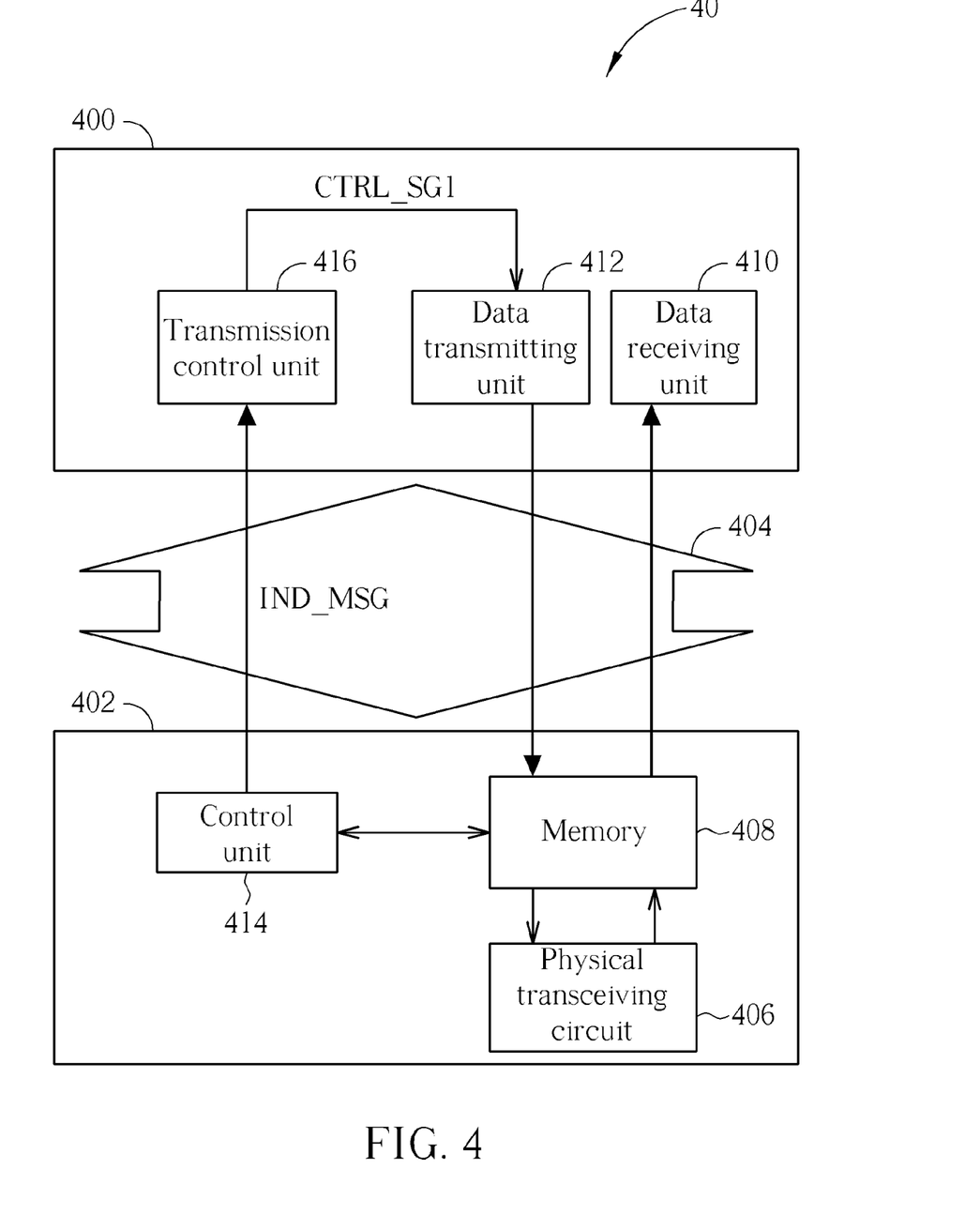
FIG. 4 is a schematic diagram of a data transmission system according to another embodiment of the present invention.

Simply speaking, before the host 400 transmits the data packet, the host 400 does not actively query the volume of the memory 408, but passively receives the indication message IND_MSG to control the data transmission. That is, the host 400 continuously transmits the data packet to the subsystem 402, and the control unit 414 outputs an indication message IND_MSG to the transmission control unit 416 for controlling the data transmission operation of the data transmitting unit 412 when the volume of the memory 408 reaches the default byte Vth (or specific percentage).

Since the host 400 does not need to query whether the available memory utilization of the memory 408 of the subsystem is enough, and starts the transmission before the host 400 transmits the data packet to the subsystem, the action of active query of the host can be omitted. That is, in the data transmission system 40, the behavior of the host 400 is not active, and the subsystem 402 actively outputs the indication message IND_MSG to control the data transmission operation of the host 400 when the volume of the memory 408 of the subsystem 402 reaches a default full value when receiving the data packet. Consequently, since the action of active query of the host is omitted, an additional query command is not necessary, and thereby the data transmission rate and efficiency between interfaces is enhanced.

Figure 5:
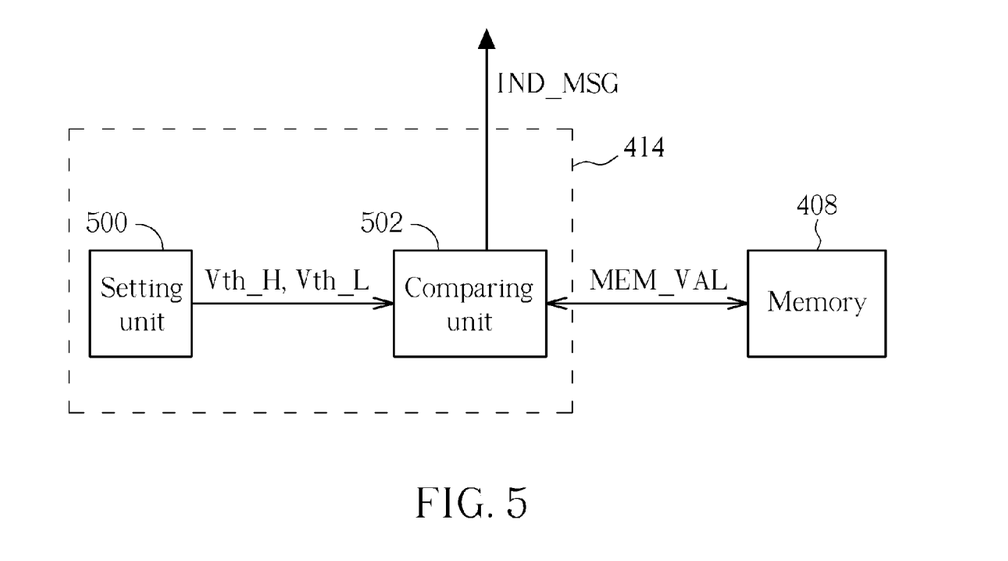
FIG. 5 is a schematic diagram of a control unit shown in FIG. 4 according to an embodiment of the present invention.

In FIG. 4, the control unit 414 outputs the indication message IND_MSG according to the volume of the memory 408, where the implementation methods can be different according to different requirements. For example, please refer to FIG. 5, which is a schematic diagram of the control unit 414 shown in FIG. 4 according to an embodiment of the present invention. In FIG. 5, the control unit 414 is composed of a setting unit 500 and a comparing unit 502. The setting unit 500 is utilized for setting a high storage threshold Vth_H and a low storage threshold Vth_L of the memory 408, and the comparing unit 502 is utilized for comparing a storage volume MEM_VAL of the memory 408 to the high storage threshold Vth_H and the low storage threshold Vth_L, for generating the indication message IND_MSG to control the data transmission of the host 400. The detailed operation is described below. When the host 400 continuously transmits the data packet to the memory 408, the comparing unit 502 of the control unit 414 queries the storage volume MEM_VAL of the memory 408 and compares the high storage threshold Vth_H and the low storage threshold Vth_L (which can be implemented by value or percentage) in the setting unit 500 which is set by the user (or the system) in advance. When the storage volume MEM_VAL is higher than the high storage threshold Vth_H, the comparing unit 502 outputs the corresponding indication message IND_MSG to the transmission control unit 416, so the transmission control unit 416 controls the data transmitting unit 412 to stop the operation of data transmission via the control signal CTRL_SG1, to avoid the memory reaching the full condition. When the storage volume MEM_VAL decreases to lower than the low storage threshold Vth_L, the comparing unit 502 outputs the corresponding indication message IND_MSG to the transmission control unit 416 asking for resuming the data transmission operation of the data transmitting unit 412.

In FIG. 5, the control unit 414 is implemented through the concept of setting a high storage threshold Vth_H and a low storage threshold Vth_L. Since the mechanism does not need the additional query action for the host 400, the data processing rate and efficiency can be enhanced. However, because the storage volume of the memory changes dynamically and the storage threshold value is a fixed value, there is a difficulty in obtaining an adequate storage threshold value to operate in coordination for fitting the dynamic changes of the memory. Therefore, to improve and enhance the utilization efficiency of the memory, the present invention further provides another embodiment, which is described below.

Figure 6:
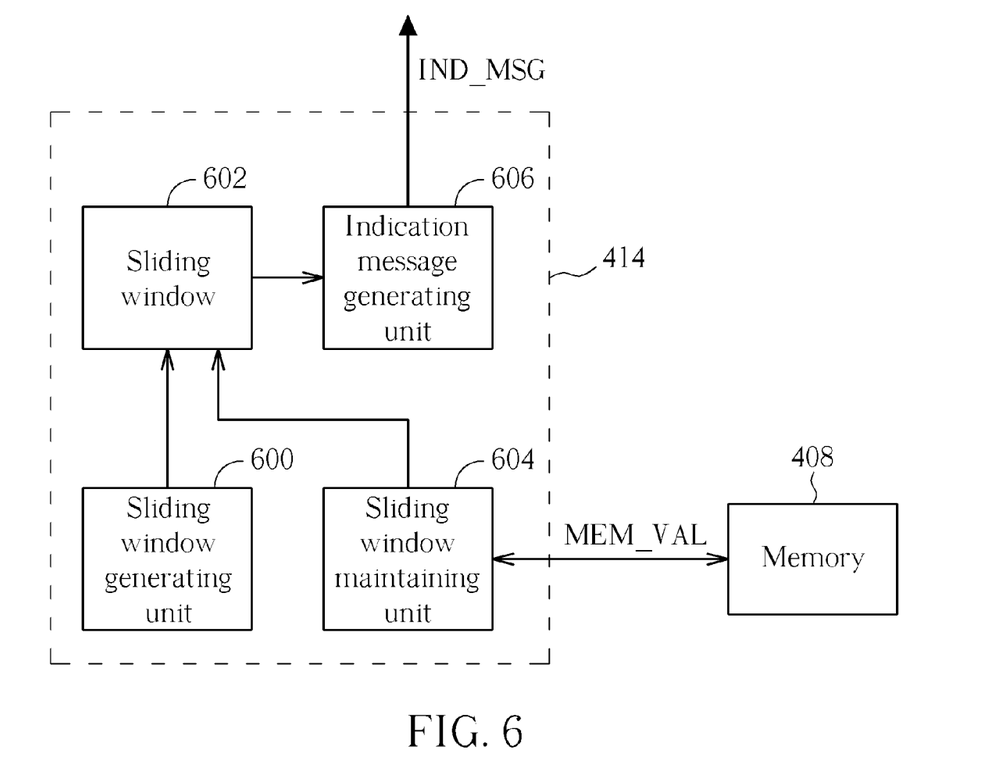
FIG. 6 is a schematic diagram of the control unit shown in FIG. 4 according to another embodiment of the present invention.

Please refer to FIG. 6, which is a schematic diagram of the control unit 414 shown in FIG. 4 according to another embodiment of the present invention. In FIG. 6, the control unit 414 comprises a sliding window generating unit 600, a sliding window 602, a sliding window maintaining unit 604, and an indication message generating unit 606. The sliding window generating unit 600 is utilized for generating the sliding window 602; the sliding window maintaining unit 604 is utilized for adjusting the length of the sliding window 602 according to each transceiving data of the memory 408, to record the storage volume MEM_VAL of the memory 408; and the indication message generating unit 606 is utilized for generating the indication message IND_MSG to control the data transmission operation of the host 400 according to the length of the sliding window 602. Two control methods of the operation of the sliding window are listed below.

The first control method is that the sliding window maintaining unit 604 increases the length of the sliding window 602 when the memory 408 receives a data packet and decreases the length of the sliding window 602 when the memory 408 outputs a data packet, for recording the storage volume MEM_VAL of the memory 408. The indication message generating unit 606 compares the storage volume MEM_VAL with a default value Vth3 (or default percentage, etc.). When the storage volume MEM_VAL is lower than the default value Vth3, the host 400 adjusts the size of the data packet transmitted to the memory 408 according to the storage status of the memory 408 indicated by the indication message IND_MSG of the indication message generating unit 606. When the storage volume MEM_VAL is higher than the default value Vth3, the indication message generating unit 606 outputs the indication message IND_MSG asking the host 400 to stop the data transmission operation. When the storage volume MEM_VAL decreases from higher than the default value Vth3 to lower than the default value Vth3, the indication message generating unit 606 outputs the indication message IND_MSG asking the host 400 to resume the data transmission operation.

The first control method is that the sliding window maintaining unit 604 decreases the length of the sliding window 602 when the memory 408 receives a data packet and increases the length of the sliding window 602 when the memory 408 outputs a data packet, for recording the storage volume MEM_VAL of the memory 408. The indication message generating unit 606 compares the storage volume MEM_VAL with a default value Vth3 (or default percentage, etc.). When the storage volume MEM_VAL is higher than the default value Vth3, the host 400 adjusts the size of the data packet transmitted to the memory 408 according to the storage status of the memory 408 indicated by the indication message IND_MSG of the indication message generating unit 606. When the storage volume MEM_VAL is lower than the default value Vth3, the indication message generating unit 606 outputs the indication message IND_MSG asking the host 400 to stop the data transmission operation. When the storage volume MEM_VAL increases from lower than the default value Vth3 to higher than the default value Vth3, the indication message generating unit 606 outputs the indication message IND_MSG asking the host 400 to resume the data transmission operation.

The two sliding window control methods mentioned above illustrate possible alterations of the present invention, and those skilled in the art can make modifications and alterations according to different requirements. Please note that the indication message IND_MSG can be implemented by methods such as hardware interrupt, mailbox, or other interfaces, etc. Similarly, the indication message IND_MSG is preferably carried in a return packet or realized by control signals between the host and the subsystem, to transmit the information of the storage volume of the memory 408 to the transmission control unit 416 of the host 400.

In FIG. 6, the embodiment of the present invention utilizes a concept of the sliding window to maintain the utilization of the memory in real time and adjust the length of the sliding window according to each transceiving data, for sufficiently controlling the storage volume of the memory, so as to further control related data transmission operation. Since the implementation method does not need the host to perform an additional query action, the data processing rate and efficiency between interfaces can be enhanced. Furthermore, since the sliding window can record the utilization of the memory in real time, the dynamic changes of the memory volume can be managed efficiently and outputting real-time and efficient data for controlling the data transmission operation of the host enhances the memory utilization efficiency.

As mentioned above, the data transmission system 40 is the flow control mechanism of the non-active host. In comparison with the data transmission system 20, the data transmission system 40 does not require additional query command QUE_CMD to query the available utilization status of the memory 408, but simply outputs the indication message IND_MSG to the host 400 by the subsystem 402 utilizing related mechanisms of the control unit 414 to control the data transmission operation. Since the active query action and additional query command of the host 400 are omitted, the data processing rate and efficiency between interfaces can be enhanced.

Figure 7:
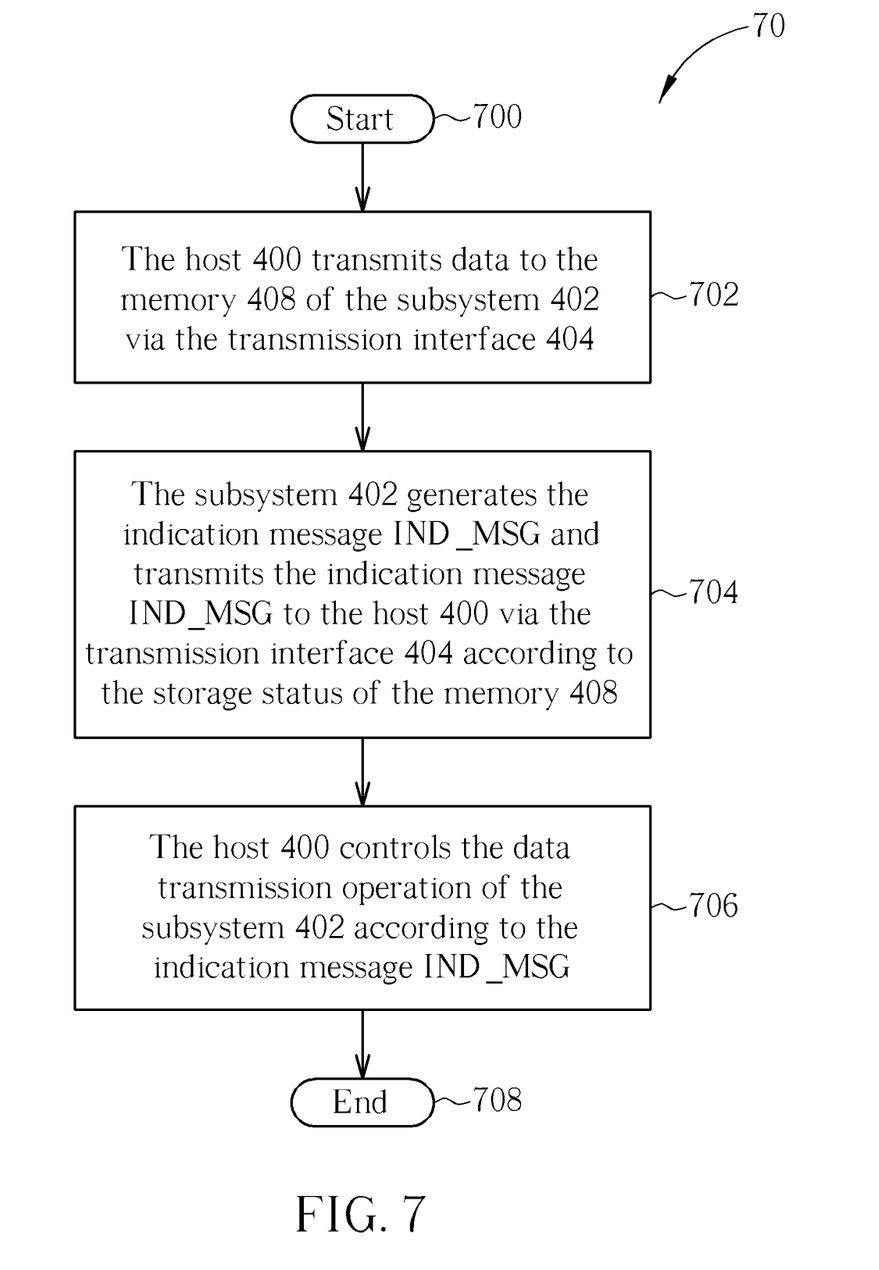
FIG. 7 is a flow chart of a control process according to another embodiment of the present invention.

Regarding the operation of the data transmission system 40, a control flow 70 is further included as shown in FIG. 7. The control flow 70 includes the following steps:

Step 700: Start.

Step 702: The host 400 transmits data to the memory 408 of the subsystem 402 via the transmission interface 404.

Step 704: The subsystem 402 generates the indication message IND_MSG and transmits the indication message IND_MSG to the host 400 via the transmission interface 404 according to the storage status of the memory 408.

Step 706: The host 400 controls the data transmission operation of the subsystem 402 according to the indication message IND_MSG.

Step 708: End.

The control flow 70 illustrates the operation of the data transmission system 40, and therefore a detailed illustration is not provided herein.

Therefore, targeting the data transmission system where the data processing rate of the subsystem higher than the data transmission rate of the transmission interface, such as the wireless transceiving device of portable communication devices (i.e. a mobile phone), the present invention provides two categories of control method. The first control method is an "active" method (for the host view), in which the host actively queries the memory status of the subsystem. The second control method is a "passive" method (for the host view), in which the subsystem replies related messages to the host according to the memory status; wherein the second control method further provides two implementation methods for applying different requirements.

To sum up, targeting a data transmission system with a low speed transmission interface, the present invention can effectively avoid the memory reaching the full condition, thereby allowing the volume of the memory to be effectively managed, so as to enhance transmission rate and efficiency.

Those skilled in the art will readily observe that numerous modifications and alterations of the device and method may be made while retaining the teachings of the invention.

What is claimed is:

1. A method for a data transmission system having a host, a subsystem and a transmission interface, utilized for the host to transmit and receive a data from a memory of the subsystem via the transmission interface, the method comprising:

the host outputting a query command to the subsystem via the transmission interface for querying available memory utilization of the subsystem;

the subsystem outputting a return message to the host via the transmission interface for indicating the available memory utilization according to the query command; and controlling data transmission from the host to the subsystem according to the return message;

wherein the step of controlling data transmission from the host to the subsystem according to the return message comprises adjusting a size of a data packet transmitted from the host to the subsystem according to the available memory utilization indicated by the return message, wherein the step of the subsystem outputting the return message to the host via the transmission interface according to the query command comprises:

generating a sliding window;

adjusting a length of the sliding window for recording a storage value of the memory according to each received data and transmitted data; and the subsystem outputting the return message to the host via the transmission interface according to the length of the sliding window.

2. The method of claim 1, wherein the return message is carried in a packet.

3. The method of claim 1, wherein a step of controlling data transmission from the host to the subsystem according to the return message further comprises stopping data transmission from the host to memory of the subsystem via the transmission interface when the return message indicates that the available memory utilization is below a default value.

4. The method of claim 1, wherein the step of controlling data transmission from the host to the subsystem according to the return message further comprises controlling data transmission from the host to memory of the subsystem via the transmission interface when the return message indicates that the available memory utilization is above a default value.

5. The method of claim 1, wherein a data processing rate of the subsystem is higher than a data transmission rate of the transmission interface.

6. A method for a data transmission system having a host, a subsystem and a transmission interface, the method comprising:

the host transmitting data to a memory of the subsystem via the transmission interface;

the subsystem generating an indication message transmitted to the host via the transmission interface according to memory utilization; and controlling data transmission from the host to the subsystem according to the indication message;

wherein the step of controlling data transmission from the host to the subsystem according to the indication message comprises adjusting a size of a data packet transmitted from the host to the subsystem according to the memory utilization indicated by the indication message;

wherein the step of the subsystem generating the indication message transmitted to the host via the transmission interface according to the memory utilization comprises:

generating a sliding window;

adjusting a length of the sliding window for recording a storage value of the memory according to each received data and transmitted data; and the subsystem generating the indication message transmitted to the host via the transmission interface according to the length of the sliding window.

7. The method of claim 6, wherein the step of the subsystem generating the indication message transmitted to the host via the transmission interface according to the memory utilization comprises: setting a high storage threshold and a low storage threshold for the memory; and comparing the storage value of the memory with the high storage threshold and the low storage threshold for generating the indication message transmitted to the host via the transmission interface.

8. The method of claim 7, wherein the step of controlling data transmission from the host to the subsystem according to the indication message further comprises stopping the host to transmit data to the memory of the subsystem via the transmission interface when the indication message indicates that the storage value is above the high storage threshold.

9. The method of claim 8 further comprising resuming the host to transmit data to the memory of the subsystem via the transmission interface when the indication message indicates that the storage value decreases from above the high storage threshold to below the low storage threshold.

10. The method of claim 6, wherein a step of adjusting the length of the sliding window for recording the storage value of the memory according to each received data and transmitted data of the memory is increasing the length of the sliding window when the memory receives a data and decreasing the length of the sliding window when the memory outputs a data, for recording the storage value of the memory.

11. The method of claim 10, wherein the step of controlling data transmission from the host to the subsystem according to the indication message further comprises stopping the host to transmit data to the memory of the subsystem of the subsystem via the transmission interface when the indication message indicates that the length of the sliding window is above a default value.

12. The method of claim 11 further comprising resuming the host to transmit data to the memory of the subsystem via the transmission interface when the indication message indicates that the length of the sliding window decreases from above the default value to below the default value.

13. The method of claim 6, wherein the step of adjusting the length of the sliding window for recording the storage value of the memory according to each received data and transmitted data of the memory is decreasing the length of the sliding window when the memory receives a data and increasing the length of the sliding window when the memory outputs a data, for recording the storage value of the memory.

14. The method of claim 13, wherein the step of controlling data transmission from the host to the subsystem according to the indication message further comprises stopping the host to transmit data to the memory of the subsystem via the transmission interface when the indication message indicates that the length of the sliding window is below a default value.

15. The method of claim 14 further comprising resuming the host to transmit data to the memory of the subsystem via the transmission interface when the indication message indicates that the length of the sliding window increases from below the default value to above the default value.

16. The method of claim 6, wherein the indication message is carried in a packet.

17. The method of claim 6, wherein a data processing rate of the subsystem is higher than a data transmission rate of the transmission interface.

* * * * *